(12) United States Patent
Meyer et al.

(10) Patent No.: US 8,293,834 B2
(45) Date of Patent: Oct. 23, 2012

(54) HYDROPHOBIC FUMED SILICA AND SILICONE RUBBER MATERIALS CONTAINING THE FUMED SILICA

(75) Inventors: Juergen Meyer, Stockstadt (DE); Horst Zeizinger, Hanau (DE); Mario Scholz, Gruendau (DE); Uwe Ellenbrand, Steinau (DE)

(73) Assignee: Evonik Degussa GmbH, Essen (DE)

( * ) Notice: Subject to any disclaimer, the term of this patent is extended or adjusted under 35 U.S.C. 154(b) by 206 days.

(21) Appl. No.: 12/600,485

(22) PCT Filed: May 6, 2008

(86) PCT No.: PCT/EP2008/055576
§ 371 (c)(1),
(2), (4) Date: Nov. 17, 2009

(87) PCT Pub. No.: WO2008/141932
PCT Pub. Date: Nov. 27, 2008

(65) Prior Publication Data
US 2010/0152349 A1    Jun. 17, 2010

(30) Foreign Application Priority Data
May 22, 2007  (DE) .................. 10 2007 024 094

(51) Int. Cl.
*C08L 83/04*    (2006.01)
(52) U.S. Cl. .................................................. 524/588
(58) Field of Classification Search .................. 524/588
See application file for complete search history.

(56) References Cited

U.S. PATENT DOCUMENTS

| | | | |
|---|---|---|---|
| 2,803,617 A | 8/1957 | Corrin | |
| 2,938,009 A | 5/1960 | Lucas | |
| 3,868,345 A | 2/1975 | Kratel et al. | |
| 3,920,865 A | 11/1975 | Laufer et al. | |
| 4,417,042 A * | 11/1983 | Dziark ............... | 528/18 |
| 4,810,305 A | 3/1989 | Braun et al. | |
| 6,316,050 B1 | 11/2001 | Troll et al. | |
| 2001/0016202 A1 | 8/2001 | Kanemaru et al. | |
| 2003/0103890 A1 | 6/2003 | Konya et al. | |
| 2005/0244642 A1 | 11/2005 | Meyer et al. | |
| 2006/0115405 A1 | 6/2006 | Konya et al. | |
| 2007/0191537 A1 | 8/2007 | Meyer et al. | |

FOREIGN PATENT DOCUMENTS

| | | |
|---|---|---|
| DE | 3628320 | 2/1988 |
| DE | 10 2004 010 756 | 9/2005 |
| EP | 0 637 616 | 2/1995 |
| EP | 1 116 753 | 7/2001 |
| EP | 1 316 589 | 6/2003 |
| GB | 1420345 | 1/1976 |
| TW | I278323 | 4/2007 |
| WO | 2004 020532 | 3/2004 |

OTHER PUBLICATIONS

Taiwanese Office Action/ Search Report completed Feb. 1, 2012, in Patent Application No. 097118374, filed May 19, 2008.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

The present invention relates to a hydrophobic, fumed silica which is obtained by reacting fumed silicas with cyclic polysiloxanes of the type $-[O-SiR_2]_n-$, where R is a $C_1$ to $C_6$ alkyl group and n is 3 to 9, and subsequently milling the silanized silicas obtained, and to a process for the preparation of the silica according to the invention, and to silicone rubber materials containing the silica according to the invention.

24 Claims, No Drawings

HYDROPHOBIC FUMED SILICA AND SILICONE RUBBER MATERIALS CONTAINING THE FUMED SILICA

The invention relates to hydrophobic fumed silica, a process for its preparation, its use and silicone rubber materials containing the hydrophobic fumed silica.

Fumed silica is known from Ullmanns Enzyklopädie der technischen Chemie [Ullmann's Encyclopaedia of Industrial Chemistry], Volume 21, page 464 (1982). The fumed silica is prepared by combusting a vaporizable silicon compound, such as, for example, silicon tetrachloride, as a mixture with hydrogen and oxygen.

Silicone rubber materials and the use of fumed silica (AEROSIL®) in silicone rubber materials are known (Ullmann's Encyclopaedia of Industrial Chemistry, Volume A 23, Rubber, 1, 221 et seq.; Rubber 3, 3, 6 et seq.; Volume A 24, Silicones, 57 et seq. 1993).

Owing to their excellent thickening effect (thixotropic effect), fumed silicas are used in silicone sealing compounds, these being desired as joint sealer in the application. If, however, the silicone rubber materials are to be used as coating materials, little thickening is advantageous (U.S. Pat. No. 6,268,300). However, the optical quality of the surface of the silicone vulcanisates is of decisive importance in every case.

It is therefore an object of the present invention to provide a fumed silica having improved properties and silicone rubber materials which exhibit an optically high-quality surface as a result of the use of this fumed silica as an active filler after vulcanization.

The technical object is achieved by a hydrophobic, fumed silica which is obtained by reacting fumed silicas with cyclic polysiloxanes of the type —[O—SiR$_2$]$_n$—, where R is a $C_1$ to $C_6$ alkyl group and n is 3 to 9, and subsequently milling the silanized silicas obtained.

In a preferred embodiment, the silica is obtained by reacting cyclic polysiloxanes of the type —[O—SiR$_2$]$_n$—, where R is a $C_1$ to $C_6$ alkyl group and n is 3, 4 or 5, and subsequently milling the silanized silicas obtained.

It is furthermore preferred if R is a methyl or ethyl group and n is 3, 4 or 5.

In a further preferred embodiment, the silica is obtained by reacting fumed silicas with cyclic polysiloxanes of the type —[O—Si(CH$_3$)$_2$]$_n$—, where n is an integer from 3 to 9, preferably from 3 to 5, particularly preferably 3, 4 or 5 and very particularly preferably 4, and subsequently milling the silanized silicas obtained.

It is furthermore particularly preferred if the silica according to the invention is obtained by reacting fumed silicas with octamethylcyclotetrasiloxane and subsequently milling the silanized silicas obtained.

The milling is preferably effected using an air-jet mill, a pinned-disc mill or a toothed-disc mill.

The silica according to the invention preferably has a tamped density of 10 to 100 g/l, particularly preferably of 15 to 75 g/l.

It is furthermore preferred if the silica has a BET specific surface area of 100 to 300 m$^2$/g, particularly preferably of 125 to 280 m$^2$/g.

In a further embodiment, the silica has a pH in the range from 3.0 to 6.5.

It is also preferred if the silica according to the invention has an agglomerate strength of 2 to 25 mm.

The silica according to the invention preferably has a carbon content of 0.1 to 10, particularly preferably of 1.0 to 5.0, % by weight.

The invention furthermore relates to a process for the preparation of the hydrophobic fumed silanized silica by reacting fumed silicas with cyclic polysiloxanes of the type —[O—SiR$_2$]$_n$—, where R is a $C_1$ to $C_6$ alkyl group and n is 3 to 9, and subsequently milling the silanized silicas obtained.

In a further preferred embodiment of the preparation process according to the present invention, the silicas used have the following physicochemical characteristics:

| | |
|---|---|
| BET surface area[1] m$^2$/g | 100-300, preferably 125-280 |
| Mean size of the primary particles nm | 7-14 |
| pH[6)7)] | 3.0-7.5 |
| C content % by weight | 1.0-4.0 |
| Loss on drying[3] (2 h at 105° C.) | <=0.5 |
| % by weight on leaving the supplier | |
| SiO$_2$ content[8] % by weight | >=99.8 |
| Al$_2$O$_3$ content[8] % by weight | <=0.050 |
| Fe$_2$O$_3$ content[8] % by weight | <=0.010 |
| TiO$_2$ content[8] % by weight | <=0.030 |
| HCl content[8)9)] % by weight | <=0.1 |

[1] According to DIN ISO 9277
[3] According to DIN EN ISO 787-2, ASTM D 280, JIS K 5101/23
[4] According to DIN EN 3262-20, ASTM D 1208, JIS K 5101/24
[5] Based on the substance dried for 2 hours at 105° C.
[6] According to DIN EN ISO 787-9, ASTM D 1208, JIS K 5101/26
[7] Water:methanol = 1:1
[8] Based on the substance ignited for 2 hours at 1000° C.
[9] HCl content in constituent of loss on ignition Fumed silicas are known from Winnacker-Küchler Chemische Technologie [Chemical Technology], Volume 3 (1983) 4th edition, page 77 and Ullmanns Enzyklopädie der technischen Chemie [Ullmann's Encyclopaedia of Industrial Chemistry], 4th edition (1982), Volume 21, page 462.

In particular, fumed silicas are prepared by flame hydrolysis of vaporizable silicon compounds, such as, for example, SiCl$_4$, or organic silicon compounds, such as trichloro-methylsilane, in the oxyhydrogen flame.

The silanized, fumed silicas used can be prepared by treating fumed silica in a known manner with cyclic polysiloxanes of the type D3 to D9, in particular D3, D4, D5, where D3 to D9, in particular D3, D4 and D5, are understood as meaning cyclic polysiloxanes having 3 to 9, in particular 3, 4 or 5, units of the type —O—Si(CH$_3$)$_2$—. Thus, octamethylcyclotetrasiloxane is the type D4.

The surface modification can be carried out by spraying the silicas first, if appropriate, with water and then with the surface modifier. The spraying can also be effected in the converse sequence or simultaneously. The water used can be acidified with an acid, for example hydrochloric acid, to a pH of 7 to 1. The water used can be rendered alkaline with a base, for example ammonia, to a pH of 7 to 14.

The mixture is then thermally treated at a temperature of 20 to 600° C. over a period of 0.1 to 6 h. The thermal treatment can be effected under inert gas, such as, for example, nitrogen.

The surface modification can be carried out continuously or batchwise in heatable mixers and dryers having spray devices. Suitable apparatuses may be, for example, ploughshare mixers, plate dryers, fluidized-bed dryers or fluid bed dryers.

The silicas according to the invention may be characterized in that they have a ratio of dimethyl- to monomethylsilyl groups of 100:0 to 50:50, preferably 100:0 to 70:30.

The ratio of dimethyl- to monomethylsilyl groups is determined by means of Si-29 solid-state NMR spectroscopy.

The temperature programme during the step for imparting water repellency is of importance for establishing the ratio of dimethyl- to monomethylsilyl groups.

In the treatment of fumed silica having a hydrophilic surface of 200 m²/g at temperatures of 350° C. to 450° C., products having 100% of dimethylsilyl groups on the silica surface are obtained. If the temperature is increased to 550° C. to 600° C., the proportion of monomethylsilyl increases to about 30%. The ratio of dimethyl- to monomethylsilyl groups is thus 70:30.

In an embodiment of the invention, the silica mixed with octamethylcyclotetrasiloxane (D4) can be fed together with the carrier medium to the fluidized bed and taken up continuously from the upper part, preferably after passing through a calming zone known per se. The feeding of the preferably used water repellent octamethylcyclotetrasiloxane (D4) can be effected in the form of the vapour.

The imparting of water repellency can advantageously be carried out directly after the preparation process for pyrogenic oxides.

The milling of the silanized, fumed silica can be effected using a pinned-disc mill, an air-jet mill or a toothed-disc mill.

The silicas according to the invention are used as thickeners or thixotropic agents in silicone rubber materials.

The technical object is furthermore achieved by a silicone rubber material which contains a hydrophobic fumed silica obtained by reacting fumed silicas with cyclic polysiloxanes of the type —[O—SiR$_2$]$_n$—, where R is a C$_1$ to C$_6$ alkyl group and n is 3 to 9, and subsequently milling the silanized silicas obtained.

It is preferable if the silica present in the silicone rubber material is obtained by reacting cyclic polysiloxanes of the type —[O—SiR$_2$]$_n$—, where R is a C$_1$ to C$_6$ alkyl group and n is 3, 4 or 5, and subsequently milling the silanized silicas obtained.

Furthermore, it is preferred if R is a methyl or ethyl group and n is 3, 4 or 5.

In a preferred embodiment, the silica present in the silicone rubber material is obtained by reacting fumed silicas with cyclic polysiloxanes of the type —[O—Si(CH$_3$)$_2$]$_n$—, where n is an integer from 3 to 9, preferably from 3 to 5, particularly preferably 3, 4 or 5 and very particularly preferably 4, and subsequently milling the silanized silicas obtained.

In a further embodiment, the silica present in the silicone rubber material is obtained by reacting fumed silicas preferably with octamethylcyclotetrasiloxane and subsequently milling the silanized silicas obtained.

It is furthermore preferred if the silica present in the silicone rubber material is obtained by milling by means of an air-jet mill, a pinned-disc mill or a toothed-disc mill.

In a further embodiment, it is preferred if the silica present in the silicone rubber material has a tamped density of 10 to 100 g/l, preferably of 15 to 75 g/l.

It is preferred if the silica present in the silicone rubber material has a BET specific surface area of 130 to 300 m²/g, preferably of 150 to 250 m²/g.

The silica present in the silicone rubber material preferably has a pH in the range from 3.0 to 7.5.

Furthermore, the silica present in the silicone rubber material preferably has an agglomerate strength of 2 to 25 mm.

The silica present in the silicone rubber material preferably has a carbon content of 0.1 to 10, preferably of 2.0 to 4.0, % by weight.

In a further preferred embodiment, the silicone rubber material contains 0.5 to 60% by weight, based on the total mass, of said silica and 40-99.5% by weight of an organopolysiloxane of the formula:

$$Z_nSiR_{3-n}\text{—}O\text{—}[SiR_2O]_x\text{—}SiR_{3-n}\text{—}Z'_n$$

where R=alkyl, alkoxy, aryl, oxime, acetoxy or alkyl radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 40-10 000 repeating units.

Z=OH, Cl, Br, acetoxy, amino, aminoxy, oxime, alkoxy, amido, alkenyloxy, acryloyloxy or phosphate radicals, it being possible for the organic radicals to carry up to 20 carbon atoms, in each case identical or different.

Z'=oxime, alkoxy, acetoxy, amino or amido, n=1–3

X=100–15 000.

In addition, it is preferred if the silicone rubber material contains 0.5 to 60% by weight, particularly preferably 3% to 30% by weight, of the silica according to the invention.

Organopolysiloxanes which may be used are all polysiloxanes which were used or could be used to date as the basis for room temperature vulcanizing (RTV) materials. They can be described, for example, by the general formula:

$$Z_nSiR_{3-n}\text{—}O\text{—}[SiR_2O]_x\text{—}SiR_{3-n}\text{—}Z'_n$$

where X, R, Z' and Z have the following meanings:

where R=alkyl, alkoxy, aryl, oxime, acetoxy or alkyl radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 40-10 000 repeating units.

Z=OH, Cl, Br, acetoxy, amino, aminoxy, oxime, alkoxy, amido, alkenyloxy, acryloyloxy or phosphate radicals, it being possible for the organic radicals to carry up to 20 carbon atoms, in each case identical or different.

Z'=oxime, alkoxy, acetoxy, amino or amido, n=1–3

X=100–15 000.

In the abovementioned formula, other siloxane units, generally present only as impurities, for example those of the formula RSiO$_{3/2}$ R3O$_{1/2}$ and SiO$_{4/2}$, where R in each case has the meaning mentioned above therefor, may also be present as diorganosiloxane units within or along the siloxane chain. The amount of these other siloxane units should not exceed 10 mol percent.

Examples of R having the meaning alkyl radical are, for example, methyl, ethyl, propyl, hexyl and octyl radicals; alkenyl radicals which may be used are vinyl, allyl, ethylallyl and butadienyl radicals; and aryl radicals which may be used are phenyl and tolyl radicals.

Examples of substituted hydrocarbon radicals R are in particular halogenated hydrocarbon radicals, such as the 3,3,3-trifluoropropyl radical, chlorophenyl radical and bromotolyl radical; and cyanoalkyl radicals, such as the β-cyanoethyl radical.

Examples of polymers as radical R are polystyrene, polyvinyl acetate, polyacrylate, polymethacrylate and polyacrylonitrile radicals linked to silicon via carbon.

The predominant part of the radicals R preferably consists of methyl groups, owing to the easier accessibility. The other radicals R are in particular vinyl and/or phenyl groups.

Particularly in the case of the presence of formulations storable in the absence of water and curing on admission of water at room temperature to give elastomers, Z and Z' are hydrolysable groups. Examples of such groups are acetoxy, amino, aminoxy, alkenyloxy (e.g. H$_2$C=(CH$_3$CO—)), acyloxy and phosphate groups. Especially owing to the easy accessibility, acyloxy groups, in particular acetoxy groups, are preferred as Z. However, excellent results are also achieved, for example, with oxime groups, such as those of the formula —ON=C(CH$_3$)(C$_2$H$_5$), as Z. Examples of hydrolysable atoms Z are halogen and hydrogen atoms. Examples of alkenyl groups Z are in particular vinyl groups.

The viscosity of the organopolysiloxanes used in the invention should not exceed 500 000 cP at 25° C., preferably 150 000 cP at 25° C. Accordingly, the value x should preferably not exceed 40 000.

Examples of organopolysiloxanes which may be used are the silicone polymers E50 (α,ω-hydroxydimethylsilyloxy-polydimethylsiloxane) or M50 (α,ω-hydroxydimethylsily-loxypolydimethylsiloxane) from GE Bayer Silicones.

It is also possible to use mixtures of different organopolysiloxanes.

The mixing of these organopolysiloxanes with the silicas according to the invention and optionally the further constituents of the formulation according to the invention can be effected in any desired known manner, for example in mechanical mixing apparatuses. It takes place very rapidly and easily, regardless of the order in which the addition of the constituents of the mixture is carried out.

Preferably, the silicas used according to the invention are used in amounts of 0.5 to 60% by weight, preferably 3% to 30% by weight, based on the total weight of the materials curable to give elastomers.

If reactive terminal units having Si-bonded hydroxyl groups are present as the only such groups in the diorganopolysiloxanes containing reactive terminal units, these diorganopolysiloxanes must be crosslinked. This can be effected in a manner known per se by the water present in the air, optionally with addition of further water comprising a crosslinking agent. Here, it is possible to use, for example, the Silopren crosslinking agent 3034 from GE Bayer Silicones, the ethyltriacetoxysilane optionally in the presence of a condensation catalyst in a known manner. Suitable catalysts for all formulations according to the invention are, for example, the Silopren catalysts DBTA or type 162 dibutyltin diacetate or dilaurate from the same manufacturer.

In a particular variant of the silicone rubber materials according to the invention, 0.5-20, preferably 2-10, % by weight of a crosslinking agent having the formula

$$R'_{4-t}SiZ'_t$$

where R'=alkyl, alkoxy, acetoxy, oxime, aryl or alkene radicals having 1 to 50 carbon atoms, unsubstituted or substituted by O, S, F, Cl, Br or I, in each case identical or different, and/or polystyrene, polyvinyl acetate, polyacrylate, polymethacrylate and polyacrylonitrile radicals having 5-5000 repeating units.

Z'=OH, Cl, Br, acetoxy, oxime, amino, aminoxy, alkenyloxy or phosphate radicals, it being possible for the organic radicals to carry up to 20 carbon atoms, in each case identical or different.

t=3 or 4, may additionally be present.

All weight data are based on the total amount of silicone rubber materials.

Examples of silanes of the abovementioned formula are ethyltriacetoxysilane, methyltriacetoxysilane, isopropyltriacetoxysilane, isopropoxytriacetoxysilane, vinyltriacetoxysilane, methyltrisdiethylaminooxysilane, methyltris (cyclohexylamino)silane, methyltris (diethylphosphato)silane and methyltris (methylethylketoximo)silane.

Of course, in addition to organopolysiloxanes, water-repellent silica, crosslinking agents and crosslinking catalysts, formulations according to the invention may optionally contain fillers conventionally used mostly or frequently in materials curable to give elastomers. Examples of such substances are fillers having a surface area of less than 50 m$^2$/g, such as quartz powder, kaolin, phyllosilicates, clay minerals, diatomaceous earth, furthermore zirconium silicate and calcium carbonate, and furthermore untreated fumed silica, organic resins, such as polyvinyl chloride powder, organopolysiloxane resins, fibrous fillers, such as asbestos, glass fibres and organic pigments, soluble dyes, fragrances, corrosion inhibitors, agents which retard curing, such as benzotriazole, and plasticizers, such as dimethyl-polysiloxanes endcapped by trimethylsilyloxy groups.

The RTV 1-component silicone rubber materials according to the invention can optionally contain 0.1-20, preferably 0.1-15, particularly preferably 0.1-10% by weight (based on the total amount of the formulation) of water-binding substances. Suitable substances for this purpose are, for example, carboxylic anhydrides, for example acetic anhydride or maleic anhydride, and/or carbonic acid esters, such as, for example, diethyl carbonate or ethyl carbonate and/or alkenyloxy compounds and/or ketals, such as, for example, dimethyldioxolane. It is possible to use one or more of these substances.

Furthermore, the silicone rubber materials may contain 0.01 to 99.5% by weight of an unfunctionalized polysiloxane. The polysiloxanes already mentioned may be used here provided that they are not functionalized. A suitable, unfunctional polysiloxane is, for example, Baysilone oil M1000 (polydimethylsiloxane) from Ge Bayer Silicones.

In addition, the silicone rubber materials may contain 0.01 to 6% by weight of organic or inorganic compounds of the metals Pt, Sn, Ti and/or Zn as a catalyst and/or 0.01 to 6% by weight of inhibitors and/or 0.01-6% by weight of fungicides and/or bactericides and/or 0.01 to 6% by weight of adhesion promoters (such as, for example, Silopren adhesion promoter 3001 from GE Bayer Silicones, having the composition: di-tert-butoxydiacetoxysilane). Fungicides/bactericides which may be used are, for example, isothiazolinone, vinycin or benzisothiazolinone.

The silicone rubber materials according to the invention can be used as silicone rubber systems from the group consisting of the room temperature vulcanizing one-component silicone rubber sealing compounds (1C-RTV) and self-levelling room temperature vulcanizing silicone rubber materials (1C-RTV).

The silicone rubber materials can be used as jointing compounds, window sealing compounds, seals in motor vehicles, sports equipment and household appliances, heat-resistant seals, oil-exuding seals, seals resistant to chemicals, and water vapour-resistant seals, and seals in electrical and electronic devices.

The silicone rubber materials can be used as coating materials for textiles, e.g. lace tape (antislip), and textile materials, e.g. woven glass fabric or woven nylon fabric.

The vulcanisates of the silicone rubber materials according to the invention advantageously have a high-quality surface.

With the use of the silicas according to the invention (cf. in particular Examples 4, 8, 12, 20 and 28), good surface properties of the silicone vulcanisates are surprisingly obtained in comparison with the starting material (starting material: unmilled silica), in spite of comparable specific surface area and tamped density. The silicone vulcanisate comprising the starting material shows only an unsatisfactory surface in spite of a lower tamped density, which, however, is also not surprising since silicas having a relatively large surface area cannot as a rule be advantageously used in silicone sealing compounds precisely for this reason.

The present invention is explained with reference to the following examples which, however, do not limit the scope of protection.

EXAMPLES

1. Milling

For the preparation of the examples according to the invention, commercially available AEROSIL® R104 (bagged product) or commercially available AEROSIL® R106 (bagged product) was metered by means of a metering balance into the mill used and was milled.

AEROSIL® R104 is a hydrophobic fumed silica based on the fumed silica AEROSIL 200, rendered water-repellent with D4 (octamethylcyclotetrasiloxane). AEROSIL® R106 is a hydrophobic fumed silica based on the fumed silica AEROSIL 300, rendered water-repellent with D4 (octamethylcyclotetrasiloxane).

A pinned-disc mill (Alpine 160Z, rotor diameter 160 mm) or an air-jet mill (grinding chamber diameter: 240 mm, grinding chamber height: 35 mm) or a toothed-disc mill (V2S, rotor diameter 210 mm, 1390 rpm) was used for the experiments. The milled product was isolated using a bag filter (filter area: 3.6 m$^2$, filter material: woven nylon fabric). In further experiments, the milled product obtained was packed by means of a commercially available bagging machine into commercially available bags. In further experiments, the bags packed with milled product were levelled by a technically customary method suitable for this purpose prior to palletization. As is commercially customary, the levelled bags were palletized and then stored for five weeks. The physicochemical characteristics of the AEROSIL® R104 or AEROSIL® R106 are shown in Table 1. The parameters of the preparation process are shown in Table 2.

TABLE 1

| | Fumed silica used | |
|---|---|---|
| | AEROSIL ® R 104 | AEROSIL ® R 106 |
| Behaviour with respect to water | hydrophobic | hydrophobic |
| Appearance | white powder | white powder |
| BET surface area[1] m$^2$/g | 125-175 | 220-280 |
| Mean primary particle size nm | 12 | 7 |
| Tamped density[2] g/l | about 50 | about 50 |
| Loss on drying[3] (2 h at 105° C.) % by weight; on leaving the supplier | <=0.5 | <=0.5 |
| C content % by weight | 1.0-2.0 | 1.5-3.0 |
| pH[6][7] | ≥4.0 | ≥3.5 |
| SiO$_2$ content[8] % by weight | >=99.8 | >=99.8 |
| Al$_2$O$_3$ content[8] % by weight | <=0.05 | <=0.05 |
| Fe$_2$O$_3$ content[8] % by weight | <=0.01 | <=0.01 |
| TiO$_2$ content[8] % by weight | <=0.03 | <=0.03 |
| HCl content[8][9] % by weight | <=0.025 | <=0.025 |

[1] According to DIN ISO 9277
[2] According to DIN EN ISO 787-11, JIS K 5101/20 (unsieved)
[3] According to DIN EN ISO 787-2, ASTM D 280, JIS K 5101/23
[6] According to DIN EN ISO 787-9, ASTM D 1208, JIS K 5101/26
[7] Water:methanol = 1:1
[8] Based on the substance ignited for 2 hours at 1000° C.
[9] HCl content in constituent of loss on ignition

TABLE 2

The table shows the parameters of the preparation of some examples of the silicas according to the invention

| Example | Mill* | MA** quantity [m$^3$] | MA** pressure [bar] | IA*** quantity [m$^3$] | IA*** pressure [bar] | Dose [kg/h] | Bagging | Levelling | Storage |
|---|---|---|---|---|---|---|---|---|---|
| 1 | AJ | 27.5 | 3.5 | 15.9 | 3.7 | 10 | No | No | No |
| 2 | AJ | 27.5 | 3.5 | 15.9 | 3.7 | 10 | Yes | No | No |
| 3 | AJ | 27.5 | 3.5 | 15.9 | 3.7 | 10 | Yes | Yes | No |
| 4 | AJ | 27.5 | 3.5 | 15.9 | 3.7 | 10 | Yes | Yes | Yes |
| 5 | AJ | 11.5 | 1.0 | 6.8 | 1.2 | 10 | No | No | No |
| 6 | AJ | 11.5 | 1.0 | 6.8 | 1.2 | 10 | Yes | No | No |
| 7 | AJ | 11.5 | 1.0 | 6.8 | 1.2 | 10 | Yes | Yes | No |
| 8 | AJ | 11.5 | 1.0 | 6.8 | 1.2 | 10 | Yes | Yes | Yes |
| 9 | PD | — | — | — | — | 10 | No | No | No |
| 10 | PD | — | — | — | — | 10 | Yes | No | No |
| 11 | PD | — | — | — | — | 10 | Yes | Yes | No |
| 12 | PD | — | — | — | — | 10 | Yes | Yes | Yes |
| 13 | TD | — | — | — | — | 10 | No | No | No |
| 14 | TD | — | — | — | — | 10 | Yes | No | No |
| 15 | TD | — | — | — | — | 10 | Yes | Yes | No |
| 16 | TD | — | — | — | — | 10 | Yes | Yes | Yes |
| 17 | AJ | 27.5 | 3.5 | 15.9 | 3.7 | 10 | No | No | No |
| 18 | AJ | 27.5 | 3.5 | 15.9 | 3.7 | 10 | Yes | No | No |
| 19 | AJ | 27.5 | 3.5 | 15.9 | 3.7 | 10 | Yes | Yes | No |
| 20 | AJ | 27.5 | 3.5 | 15.9 | 3.7 | 10 | Yes | Yes | Yes |
| 21 | AJ | 11.5 | 1.0 | 6.8 | 1.2 | 10 | No | No | No |
| 22 | AJ | 11.5 | 1.0 | 6.8 | 1.2 | 10 | Yes | No | No |
| 23 | AJ | 11.5 | 1.0 | 6.8 | 1.2 | 10 | Yes | Yes | No |
| 24 | AJ | 11.5 | 1.0 | 6.8 | 1.2 | 10 | Yes | Yes | Yes |
| 25 | PD | — | — | — | — | 10 | No | No | No |
| 26 | PD | — | — | — | — | 10 | Yes | No | No |
| 27 | PD | — | — | — | — | 10 | Yes | Yes | No |
| 28 | PD | — | — | — | — | 10 | Yes | Yes | Yes |
| 29 | TD | — | — | — | — | 10 | No | No | No |

TABLE 2-continued

The table shows the parameters of the preparation of some
examples of the silicas according to the invention

| Example | Mill* | MA** quantity [m³] | MA** pressure [bar] | IA*** quantity [m³] | IA*** pressure [bar] | Dose [kg/h] | Bagging | Levelling | Storage |
|---|---|---|---|---|---|---|---|---|---|
| 30 | TD | — | — | — | — | 10 | Yes | No | No |
| 31 | TD | — | — | — | — | 10 | Yes | Yes | No |
| 32 | TD | — | — | — | — | 10 | Yes | Yes | Yes |

*AJ = air-jet mill; PD = pinned-disc mill; TD = toothed-disc mill
MA** = milling air;
IA*** = injector air 2. Determination of the Physicochemical Characteristics of the Milled Silicas 2.1 BET Surface Area The BET surface area is determined according to DIN ISO 9277.

2.2. Tamped Density

The determination of the tamped density is effected according to DIN EN ISO 787-11.

Principles of the Tamped Density Determination:

The tamped density (formerly tamped volume) is equal to the quotient of the mass and the volume of a powder after tamping in a tamped density determination apparatus under specified conditions. According to DIN ISO 787/XI, the tamped density is stated in g/cm³. Owing to the very low tamped density of the oxides, however, we state the value in g/l. Furthermore, the drying and sieving and the repetition of the tamping process are dispensed with.

Apparatuses for Tamped Density Determination:
Tamped density determination apparatus
Measuring cylinder
Laboratory balance (accuracy of reading 0.01 g)

Tamped Density Determination Procedure:

200±10 ml of oxide are introduced into the measuring cylinder of the tamped density determination apparatus so that no cavities remain and the surface is horizontal. The mass of the sample introduced is determined accurately to 0.01 g. The measuring cylinder with the sample is inserted into the measuring cylinder holder of the tamped density determination apparatus and tamped 1250 times. The volume of the tamped oxide is read to an accuracy of 1 ml.

Evaluation of the Tamped Density Determination:

$$\text{Tamped density (g/l)} = \frac{\text{g sample weight} \times 1000}{\text{ml volume read}}$$

2.3 Determination of the pH

Reagents for the pH Determination:
distilled or demineralized water, pH>5.5
Methanol, p.a.
Buffer solutions pH 7.00, pH 4.66

Apparatuses for the pH Determination:
Laboratory balance (accuracy of reading 0.1 g)
Beaker, 250 ml
Magnetic stirrer
Magnetic rod, length 4 cm
combined pH electrode
pH meter
Dispensette, 100 ml Working Method for Determination of the pH:

The determination is effected according to DIN EN ISO 787-9.

Calibration: before the pH measurement, the meter is calibrated with the buffer solutions. If a plurality of measurements is carried out in succession, a single calibration is sufficient.

4 g of oxide are converted into a paste with 48 g (61 ml) of methanol in a 250 ml beaker, and the suspension is diluted with 48 g (48 ml) of water and stirred for five minutes with a magnetic stirrer (speed about 1000 min$^{-1}$), with the pH electrode immersed.

After the stirrer has been switched off, the pH is read after a standing time of one minute. The result is reported to one decimal place.

Table 3 summarizes the physicochemical data of the silicas according to the invention, such as specific surface area, pH, tamped density and agglomerate strength.

2.3 Determination of the Agglomerate Strength

General

The dispersibility of Aerosil is dependent on the strength of the agglomerates present in the material and the amount of agglomerates. The agglomerate strength is determined for the sieve fraction 1.0-3.15 mm.

Apparatuses

Test sieves of 3.15 mm and 1.0 mm mesh size (according to DIN 4188) agglomerate strength tester (own construction of Degussa Wolfgang)

Technical data of the agglomeration strength tester
Electric motor with worm gear 8.8 N×m (90 cm·kp) max·torque
Ram diameter=12.0 mm
Sleeve bore=12.1 mm
Height of the sleeve=70.0 mm
Ram pressure=68.6 N (7.0 kp)
Stroke of the ram=85.8 mm
Specific compressor pressure=6158.6 N/cm² (628.0 kp/cm²)
Average speed of the ram=1.19 cm/sec.
Maximum speed=1.87 cm/sec.

Acceleration and deceleration of the ram take place approximately sinusoidally.

Materials: Ram consisting of chromium-plated steel. Sleeve consisting of chromium-plated brass.

Mode of Action

An electric motor lowers the ram by means of a rod system into the sleeve filled with agglomerates. The ram is subjected to a constant load of 68.6 N (7 kp) during this procedure. The ram compresses the agglomerates more or less strongly depending on the agglomerate hardness. The height of the remaining pellet is indicated on an mm scale. After the compression, the rod system detaches itself from the ram, moves to its lower starting position and automatically remains stationary there. After the measurement, the rod system raises the ram again to its upper starting position at the press of a button.

Procedure

For determining the agglomerate strength, the silica is sieved through a 3.15 mm sieve (mesh size according to DIN 4188), under which a 1.0 mm sieve (mesh size according to DIN 4188) is present. The sieve residue of the sieve fraction 1.0 mm to 3.15 mm is filled with the aid of the funnel which is present on the sleeve. In order to establish an exactly defined silica volume, the conical heap on the sleeve is scraped off after removing the funnel, and the funnel is replaced. The sleeve is inserted into the fastening on the housing. When the apparatus is switched on, the ram is slowly lowered onto the agglomerates in the sleeve by an electric motor. After the motor has been switched off, the agglomerate strength is read in mm on the scale. By switching on again, the ram is raised with the weight back to the starting position.

TABLE 3

Physicochemical data of the silicas according to the invention

| Designation | BET specific surface area [m²/g] | pH | Tamped density [g/l] | Agglomerate strength* [mm] |
|---|---|---|---|---|
| Comparative Example 1 | 159 | 4.7 | 75 | 22 |
| Comparative Example 2 | 245 | 4.6 | 72 | 24 |
| Example 1 | 159 | 4.7 | 15 | 3 |
| Example 2 | — | 4.7 | 55 | 14 |
| Example 3 | — | 4.6 | 60 | 18 |
| Example 4 | 157 | 4.7 | 70 | 23 |
| Example 5 | 158 | 4.7 | 21 | 2 |
| Example 6 | — | 4.6 | 52 | 14 |
| Example 7 | — | 4.6 | 65 | 15 |
| Example 8 | 160 | 4.7 | 67 | 17 |
| Example 9 | 161 | 4.6 | 19 | 5 |
| Example 10 | — | 4.6 | 52 | 15 |
| Example 11 | — | 4.7 | 63 | 15 |
| Example 12 | 160 | 4.7 | 64 | 18 |
| Example 13 | 161 | 4.7 | 40 | 13 |
| Example 14 | — | 4.7 | 52 | 18 |
| Example 15 | — | 4.7 | 66 | 18 |
| Example 16 | 159 | 4.7 | 73 | 20 |
| Example 17 | 241 | 4.6 | 14 | too few agglomerates |
| Example 18 | —. | 4.6 | 40 | 18 |
| Example 19 | — | 4.6 | 36 | 17 |
| Example 20 | 240 | 4.7 | 64 | 18 |
| Example 21 | 243 | 4.6 | 16 | too few agglomerates |
| Example 22 | — | 4.5 | 42 | 16 |
| Example 23 | — | 4.5 | 53 | 16 |
| Example 24 | 242 | 4.7 | 67 | 20 |
| Example 25 | 241 | 4.6 | 16 | too few agglomerates |
| Example 26 | — | 4.6 | 28 | 15 |
| Example 27 | — | 4.6 | 45 | 16 |
| Example 28 | 241 | 4.7 | 59 | 16 |
| Example 29 | 240 | 4.6 | 43 | no agglomerates |
| Example 30 | — | 4.5 | 48 | too few agglomerates |
| Example 31 | — | 4.5 | 53 | too few agglomerates |
| Example 32 | 238 | 4.7 | 67 | 19 |

The data of the milled products show virtually constant specific surface areas and unchanged pH compared with the starting material, which are also retained in the case of compaction, evident from the higher tamped densities, as a result of bagging or bagging/levelling and even after bagging/levelling/storage.

3. Testing of Performance Characteristics 3.1 Description of Tests

The tests for determining the surface property of silicone vulcanisates were carried out in a Speedmixer with the following formulation:

| 62% of Polymer E 50 | 31.0 g | |
|---|---|---|
| 25% of oil M 1000 | 12.5 g | |
| 1% of carbon black | 0.5 g | |
| | | 15 s 2500 min⁻¹ |
| 4% of crosslinking agent | 2.0 g | |
| | | 15 s 2500 min⁻¹ |
| 8% of silica | 4.0 g | |
| | | 2 × 30 s 2500 min⁻¹ |
| 1 drop of dibutyltin dilaurate | | 2 × 60 s 2500 min⁻¹ |

31 g (62%) of α,ω-hydroxydimethylsilyloxypolydimethylsiloxane (E 50, GE Bayer Silicones) are initially introduced into a PE beaker having a screw cap. 12.5 g (25%) of α,ω-trimethylsilyloxypolydimethylsiloxane (M1000, GE Bayer Silicones) are then added. After addition of 0.5 g (1%) of carbon black (Printex 3, Degussa AG), the mixture is mixed for 15 sec at 2500 rpm in the Speedmixer.

2.0 g (4%) of ethyltriacetoxysilane (AC 3034, GE Bayer Silicones) are then added to this mixture and mixing is effected at 2500 rpm for 15 s in the Speedmixer. Thereafter 4.0 g (8%) of fumed silica are mixed in at 2500 rpm in the course of 30 sec or in two stages (2×15 sec) in the Speedmixer. Material adhering to the inner surface is scraped off and the batch is mixed again for 30 sec at 2500 rpm. After addition of 1 drop (0.01%) of dibutyltin dilaurate, mixing is effected for 120 sec at 2500 rpm in the Speedmixer. The silicone formulation thus obtained is spread using a knife coater and vulcanized at room temperature in room air in the course of 24 h. The surface of the vulcanisates is assessed optically and rated according to a school marking system:

Marks: 1=very good, 2=good, 3=satisfactory, 4=unsatisfactory, 5=poor

The mark 1 is given if the vulcanisate has no defects or undispersed particles at all. Very few defects are visible in the case of mark 2, and slightly more in the case of the mark 3. In the case of the mark 4, so many defects are visible that the surface appearance would no longer be acceptable for technical use. The same applies to a greater extent for the mark 5.

Table 4 summarizes the tests for assessing the surface of the silicone rubber materials containing the silicas according to the invention. With the use of the silicas from Examples 4, 8, 12, 20 and 28, good surface properties of the silicone vulcanisates are surprisingly obtained in comparison with the starting material (Comparative Examples 1 and 2: unmilled hydrophobic fumed silica), in spite of comparably large surface area and comparable tamped density. The silicone vulcanisate comprising the standard material shows only an unsatisfactory surface in spite of low tamped density, which, however, is also not surprising since silicas having relatively large surface areas cannot as a rule advantageously be used in silicone sealing compounds precisely for this reason.

TABLE 4

Tests for assessing the surface of the silicone rubber materials containing the silicas according to the invention

| Test No. | Product/Milling Bagging Levelling Storage | Example | Surface [Marks] |
|---|---|---|---|
| 1 | Comparative material 1 | | 4.0 |
| 2 | AJ* Yes Yes Yes | 4 | 2.0 |

TABLE 4-continued

Tests for assessing the surface of the silicone rubber materials containing the silicas according to the invention

| Test No. | Product/Milling Bagging Levelling Storage | Example | Surface [Marks] |
|---|---|---|---|
| 3 | AJ* Yes Yes Yes | 8 | 2.0 |
| 4 | PD* Yes Yes Yes | 12 | 2.5 |
| 5 | Comparative material 2 | | 3.5 |
| 6 | AJ* Yes Yes Yes | 20 | 2.5 |
| 7 | PD* Yes Yes Yes | 28 | 2.5 |

*AJ = air-jet mill; PO = pinned-disc mill

The invention claimed is:

1. A hydrophobic, fumed silica which is obtained by a process comprising:
   reacting a fumed silica with a cyclic polysiloxane represented by —[O—SiR$_2$]$_n$—, where R is a C$_1$ to C$_6$ alkyl group and n is 3 to 9; and
   subsequently milling silanized silicas by using an air-jet mill, a pinned-disc mill or a toothed-disc mill.

2. The silica according to claim 1, wherein n is 3, 4 or 5.

3. The silica according to claim 2, wherein the silica has a carbon content of 0.1 to 10% by weight.

4. The silica according to claim 1, wherein R is a methyl or ethyl group and n is 3, 4 or 5.

5. The silica according to claim 1, wherein the reacting comprises reacting said fumed silica with said cyclic polysiloxane represented by —[O—Si(CH$_3$)$_2$]$_n$, where n is an integer from 3 to 9.

6. The silica according to claim 1, wherein the reacting comprises reacting said fumed silica with octamethylcyclotetrasiloxane.

7. The silica according to claim 1, wherein the silica has a tamped density of 10 to 100 g/l.

8. The silica according to claim 1, wherein the silica has a BET specific surface area of 100 to 300 m$^2$/g.

9. The silica according to claim 1, wherein the silica has a pH in a range from 4.0 to 5.0.

10. The silica according to claim 1, wherein the silica has an agglomerate strength of 2 to 25 mm.

11. A process for preparing the hydrophobic fumed silanized silica according to claim 1, comprising:
    reacting said fumed silica with said cyclic polysiloxane represented by —[O—SiR$_2$]$_n$—, where R is a C$_1$ to C$_6$ alkyl group and n is 3 to 9; and
    subsequently milling silanized silicas obtained.

12. A silicone rubber material, comprising the silica according to claim 1.

13. The silicone rubber material according to claim 12, wherein n is 3, 4 or 5.

14. The silicone rubber material according to claim 12, wherein R is a methyl or ethyl group and n is 3, 4 or 5.

15. The silicone rubber material according to claim 12, wherein the silica present in the silicone rubber material is obtained by a process comprising reacting said fumed silica with said cyclic polysiloxane represented by —[O—Si(CH$_3$)$_2$]$_n$, where n is an integer from 3 to 9, and subsequently milling the silanized silicas obtained.

16. The silicone rubber material according to claim 12, wherein the silica present in the silicone rubber material is obtained by a process comprising reacting said fumed silica with octamethylcyclotetrasiloxane and subsequently milling the silanized silicas obtained.

17. The silicone rubber material according to claim 12, wherein the silica present in the silicone rubber material has a tamped density of 10 to 100 g/l.

18. The silicone rubber material according to claim 12, wherein the silica present in the silicone rubber material has a BET specific surface area of 100 to 300 m$^2$/g.

19. The silicone rubber material according to claim 12, wherein the silica present in the silicone rubber material has a pH in a range from 4.0 to 5.0.

20. The silicone rubber material according to claim 12, wherein the silica present in the silicone rubber material has an agglomerate strength of 2 to 25 mm.

21. The silicone rubber material according to claim 12, wherein the silica present in the silicone rubber material has a carbon content of 0.1 to 10% by weight.

22. The silicone rubber material according to claim 12, wherein said silicone rubber material comprises 0.5 to 60% by weight, based on a total mass, of said silica and 40-99.5% by weight of an organopolysiloxane of the formula $$Z_n SiR_{3-n}\text{—}O\text{—}[SiR_2O]_x\text{—}SiR_{3-n}\text{—}Z'_n$$

where R is alkyl, alkoxy, aryl, oxime, acetoxy or alkyl radicals having 1 to 50 carbon atoms, unsubstituted or substituted by O, S, F, Cl, Br or I, in each case identical or different; polystyrene, polyvinyl acetate, polyacrylate, polymethacrylate and polyacrylonitrile radicals having 40-10 000 repeating units; or a combination thereof, Z is OH, Cl, Br, acetoxy, amino, aminoxy, oxime, alkoxy, amido, alkenyloxy, acryloyloxy or phosphate radicals, it being possible for the organic radicals to carry up to 20 carbon atoms, in each case identical or different, Z' is oxime, alkoxy, acetoxy, amino or amido, n is 1-3, and X is 100-15000.

23. The silicone rubber material according to claim 12, wherein said silicone rubber material comprises 0.5 to 60% by weight of the silica.

24. The silica according to claim 1, wherein the silica has a tamped density of 15 to 75 g/l.

* * * * *